United States Patent [19]

Takada

[11] Patent Number: 5,057,666

[45] Date of Patent: Oct. 15, 1991

[54] ANTI-FROST SYSTEM FOR MOTOR VEHICLE WINDSHIELD UTILIZING SATURATED STEAM CALCULATOR

[75] Inventor: Hirohisa Takada, Tokyo, Japan

[73] Assignee: Fuji Jukogyo Kabushiki Kaisha, Tokyo, Japan

[21] Appl. No.: 425,958

[22] Filed: Oct. 24, 1989

[30] Foreign Application Priority Data

Oct. 29, 1988 [JP] Japan ................... 63-275847

[51] Int. Cl.$^5$ ..................... H05B 1/02; B60L 1/02
[52] U.S. Cl. ........................... 219/203; 219/522; 52/171; 307/10.1
[58] Field of Search ............ 219/203, 522, 547; 52/171, 172; 374/27-28; 307/10.1

[56] References Cited

U.S. PATENT DOCUMENTS

| | | | |
|---|---|---|---|
| 3,434,347 | 3/1969 | Lockwood | 374/28 |
| 3,934,111 | 1/1976 | Roselli et al. | 219/203 |
| 4,902,874 | 2/1990 | Tachimori et al. | 219/203 |

FOREIGN PATENT DOCUMENTS 1114559  5/1989  Japan.

Primary Examiner—Bruce A. Reynolds
Assistant Examiner—John A. Jeffery
Attorney, Agent, or Firm—Beveridge, DeGrandi & Weilacher

[57] ABSTRACT

An anti-frost system for the windshield of a motor vehicle has a heating element incorporated in the windshield. The system has an atmospheric temperature sensor, a relative humidity sensor and a windshield temperature sensor. Signals from the atmospheric temperature sensor and the relative humidity sensor are inputted to a calculator circuit which calculates a saturated steam temperature from the input signals. The saturated steam temperature and the windshield temperature are delivered to an operation circuit, which determines that frosting on the windshield is expected under a combined condition to the windshield temperature and the saturated steam temperature and which turns a transistor on to close a switch to energize the heating element for preventing frosting in advance.

5 Claims, 2 Drawing Sheets

ANTI-FROST SYSTEM FOR MOTOR VEHICLE WINDSHIELD UTILIZING SATURATED STEAM CALCULATOR

BACKGROUND OF THE INVENTION

The present invention relates to an anti-frost system for a windshield of a motor vehicle, and, more particularly, to an anti-frost system of a windshield wherein general-purpose sensors can be used as sensors for detecting frosting conditions.

Various anti-frost systems for the windshield of motor vehicles have been proposed. For instance, in an anti-frost system actually in use, frost accumulated over the surface of the windshield is melted by electric power supplied from an alternator power supply mounted on the vehicle. In this system a thin metal film resistor is laminated with windshield sheets and the resistor is energized by turning on a switch after the vehicle engine has been started.

The above mentioned system is a defrosting system. Because the windshield must be heated above 0° C., an electric power supply system (an alternator and regulator) capable of supplying high voltage and high power (for instance, 50-60 V and more than 1500 W) must be mounted on the vehicle so that changes to the specifications of the power supply system must be made. An example of such a system is disclosed in Japanese Patent Laid-Open (Unexamined) Publication No. 58-174,046.

In view of the above, there has been proposed an anti-frost system for preventing accumulation of frost in advance in Japanese Patent Laid-Open (Unexamined) Publication No. 1-114,559. This system is not a defrosting system. According to the system, when the temperature and humidity in the atmosphere surrounding the windshield become a condition involving a possibility of frosting, a heating element incorporated in the windshield is energized through a controller, thereby preventing the accumulation of frost on the windshield in advance.

The known system stated above has a temperature sensor and a humidity sensor. These sensors are special sensors. For example, the humidity sensor is a special sensor for sensing humidity on the windshield and must be installed on the windshield. Output signals from these sensors are delivered to the controller. When the temperature and humidity conditions predict a possibility of frosting on the windshield, the controller operates to energize the heating element incorporated in the windshield.

The known system needs special sensors as mentioned above. In order for these sensors to correctly detect the weather conditions, the places at which these sensors are installed are strictly limited. Because of the construction of motor vehicles, ideal places cannot be freely selected so that sometimes conditions of frosting are not properly detected. In other words, the limitation to the places at which the sensors are installed presents a bottleneck for correct detection of weather conditions.

Moreover, in addition to the battery for the engine, another battery must be mounted on the vehicle solely for the purpose of energizing the heating element in the windshield, or a large-sized battery must be used for the same purpose.

SUMMARY OF THE INVENTION

The primary object of the present invention is to provide an anti-frost system which affords a relatively wide freedom of selection of the place at which each sensor is installed and which correctly detects conditions of the frosting whereby the accumulation of frost on the windshield is positively prevented in advance.

According to the present invention, there is provided an anti-frost system for a windshield of a motor vehicle, having heating means incorporated in the windshield, power supply means for supplying electric power to the heating means, and a controller operating to supply the electric power to the heating means to energize the heating means when conditions for frosting on the windshield are satisfied, the system comprising: an atmospheric temperature sensor for delivering an atmospheric temperature signal; a relative humidity sensor for delivering a relative humidity signal; a windshield temperature sensor for sensing the temperature of the windshield and for delivering a windshield temperature signal; calculator means responsive to the atmospheric temperature signal and the relative humidity signal, for calculating a saturated steam temperature and for producing a saturated steam temperature signal; and operation means responsive to the saturated steam temperature signal and the windshield temperature signal for operating to supply the electric power to said heating means in accordance with determination of the conditions of frosting on the windshield.

A preferred embodiment of the present invention will become understood from the following detailed description referring to the accompanying drawings.

DESCRIPTION OF THE PREFERRED EMBODIMENT

Figure 1:
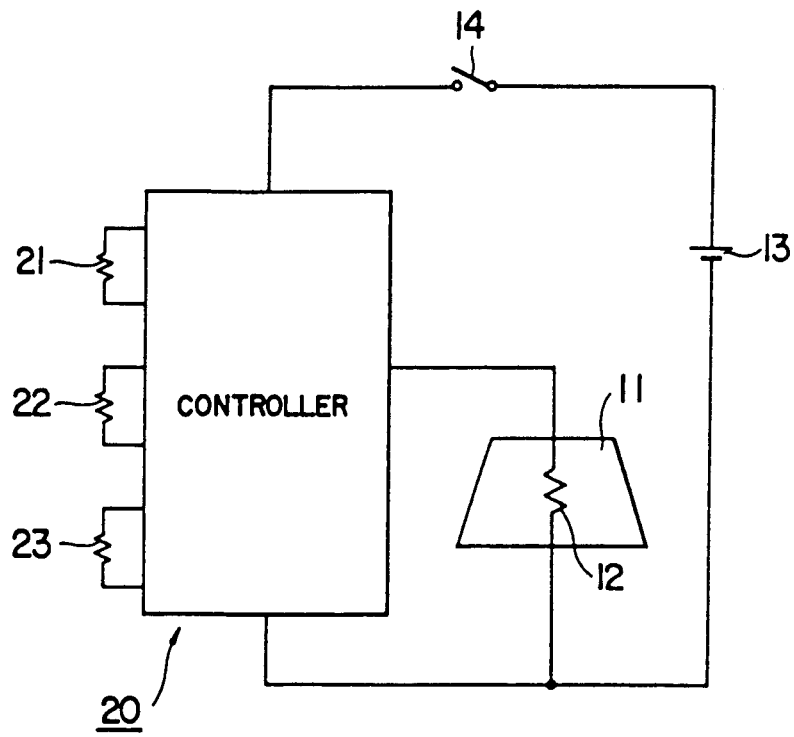
FIG. 1 is a view showing an anti-frost system for a motor vehicle in accordance with the present invention.

Referring first to FIG. 1, a windshield 11 of a motor vehicle is made of a lamination of glass sheets which incorporates therein a heating element 12 in the form of a film made by a vacuum vapor deposition technique. The electric power for energizing the heating element 12 is supplied from a power supply or battery 13 through an operation switch 14 and a controller 20 in order to prevent the accumulation of frost on the windshield 11.

Output signals from an atmospheric temperature sensor 21, a relative humidity sensor 22 and a windshield temperature sensor 23 are delivered to the controller 20.

Figure 2:
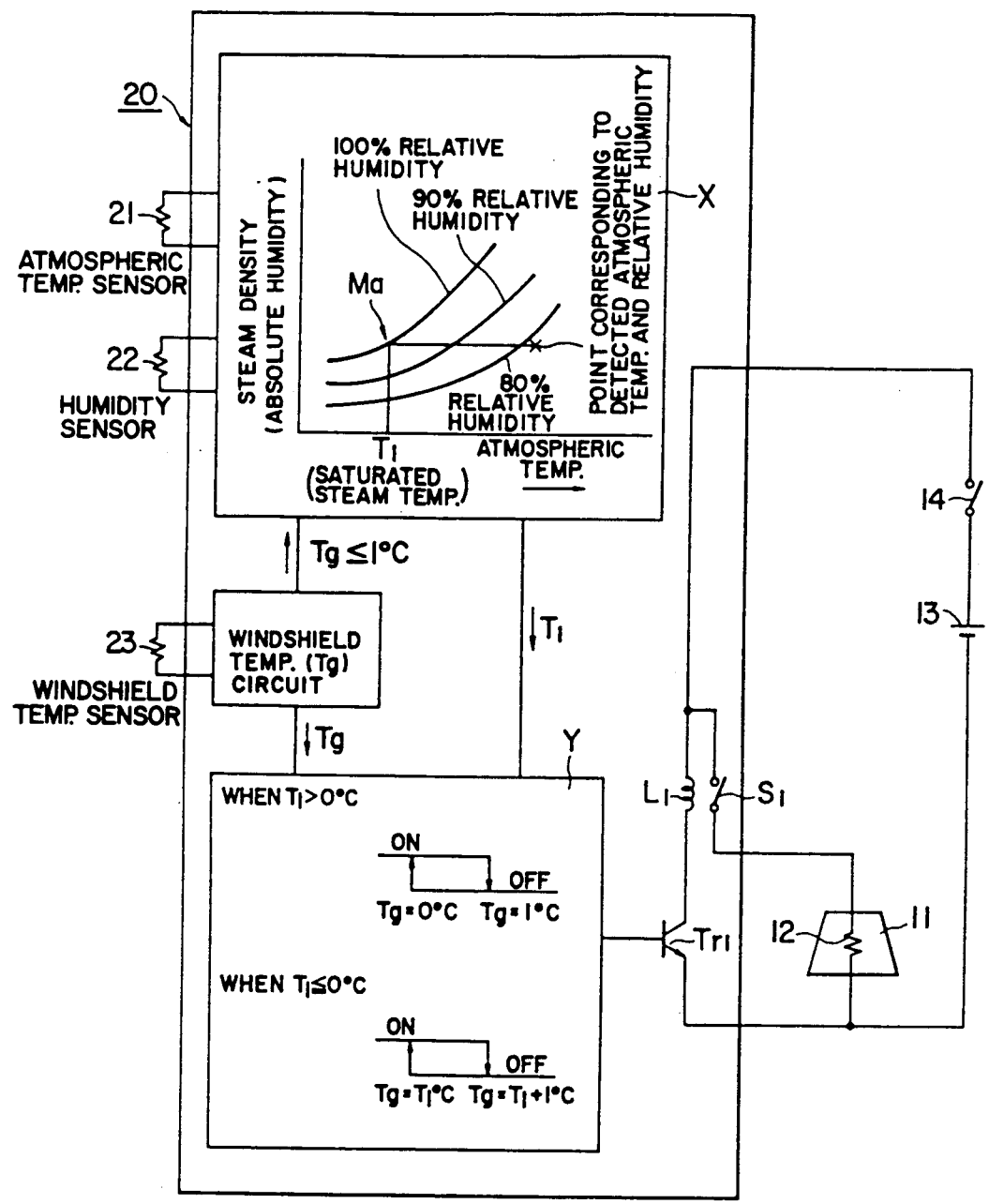
FIG. 2 is a view showing a controller in more detail.

The detail of the controller 20 is shown in FIG. 2. The atmospheric temperature sensor 21 and the humidity sensor 22 deliver their respective output signals to a saturated steam temperature calculating circuit X with a map Ma of the controller 20. The map Ma represents the steam density-temperature relation. In response to the thus inputted atmospheric temperature and relative humidity, the map Ma gives a steam density (absolute humidity) and saturated steam temperature $T_1$. A signal representative of the saturated steam temperature $T_1$ is delivered to an operation circuit Y incorporated in the controller 20.

Furthermore, an output signal representative of the windshield temperature Tg detected by the windshield temperature sensor 23 is delivered also to the operation circuit Y. Depending upon the condition $T_1 > 0°$ C. or $T_1 \leq 0°$ C., different operations are carried out as described below.

The output terminal of the operation circuit Y is connected to the base of a transistor $Tr_1$ which is enabled or disabled by an output signal from the operation circuit Y. The collector of the transistor $Tr_1$ is connected through a solenoid $L_1$ and the switch 14 to the (+) terminal of the battery 13 while the emitter of the transistor $Tr_1$ is connected to the (-) terminal of the battery 13. When the solenoid $L_1$ is energized or deenergized, a relay switch $S_1$ is turned on or off to permit or cut off the power supply to the heating element 12 in the windshield 11.

In case the saturated steam temperature $T_1$ is in excess of 0° C., the operation circuit Y outputs a signal to turn the transistor $Tr_1$ on when Tg is 0° C. while the operation circuit Y output the signal to turn the transistor $Tr_1$ on when Tg is 1° C. or higher. On the other hand, in case the saturated steam temperature $T_1$ is equal to or lower than 0° C., the operation circuit Y outputs the signal to turn the transistor $Tr_1$ on when Tg is $T_1°$ C. while the operation circuit Y outputs the signal to turn the transistor $Tr_1$ off when Tg is $(T_1 + 1°$ C.) or higher.

When the transistor $Tr_1$ is turned on, the solenoid $L_1$ is excited whereby the relay switch $S_1$ is closed so that the heating element 12 in the windshield 11 receives electric power and is energized.

The windshield temperature Tg detected by the sensor 23 is delivered to the saturated steam temperature calculating circuit X when the windshield temperature falls to or below 1° C., and the delivery of the signal of the sensor 23 to the circuit X enables the circuit to receive the signals from the atmospheric sensor 21 and the relative humidity sensor 22.

The operation of the preferred embodiment of the present invention will be described below.

When the temperature Tg of the windshield 11 is above 0° C., there is no possibility of the accumulation of frost on the windshield 11 so that the controller 20 is inoperative.

When the atmospheric temperature falls and the temperature Tg of the windshield 11 falls to 1° C., the saturated steam temperature calculating circuit X starts to feed the signals from the atmospheric temperature sensor 21 and the humidity sensor 22. The calculating circuit X then operates to give a saturated steam temperature $T_1$ based on the map Ma and delivers the temperature $T_1$ to the operation circuit Y. At the same time, the temperature Tg of the windshield 11 is inputted to the operation circuit Y.

The operation circuit Y then operates as follows. When the saturated steam temperature $T_1$ is in excess of 0° C. (water freezing point), the possibility of frosting on the windshield 11 occurs only when the temperature Tg of the windshield 11 drops to or below 0° C. Therefore, as long as the temperature Tg of the windshield 11 is above 0° C., the operation circuit Y does not turn the transistor $Tr_1$ on so that the heating element 12 is not energized. When the temperature Tg of the windshield 11 falls to or below 0° C., the operation circuit Y operates to turn the transistor $Tr_1$ on whereby the heating element 12 is energized to prevent the accumulation of frost. When the temperature Tg of the windshield 11 rises to 1° C., the possibility of frosting disappears so that the operation circuit Y operates to turn the transistor $Tr_1$ off and the heating element 12 is deenergized.

When the saturated steam temperature $T_1$ is equal to or below 0° C., accumulation of frost occurs only when the temperature Tg of the windshield 11 is equal to or below the saturated steam temperature $T_1$. For this reason, when it is detected that the temperature Tg of the windshield 11 is at or below $T_1$, the operation circuit Y operates to turn the transistor $Tr_1$ on to energize the heating element 12 so as to prevent frosting. When the temperature Tg of the windshield 11 rises to $T_1 + 1°$ C., the possibility of frosting disappears so that the operation circuit Y operates to turn the transistor $Tr_1$ off to deenergize the heating element 12.

Figure 3:
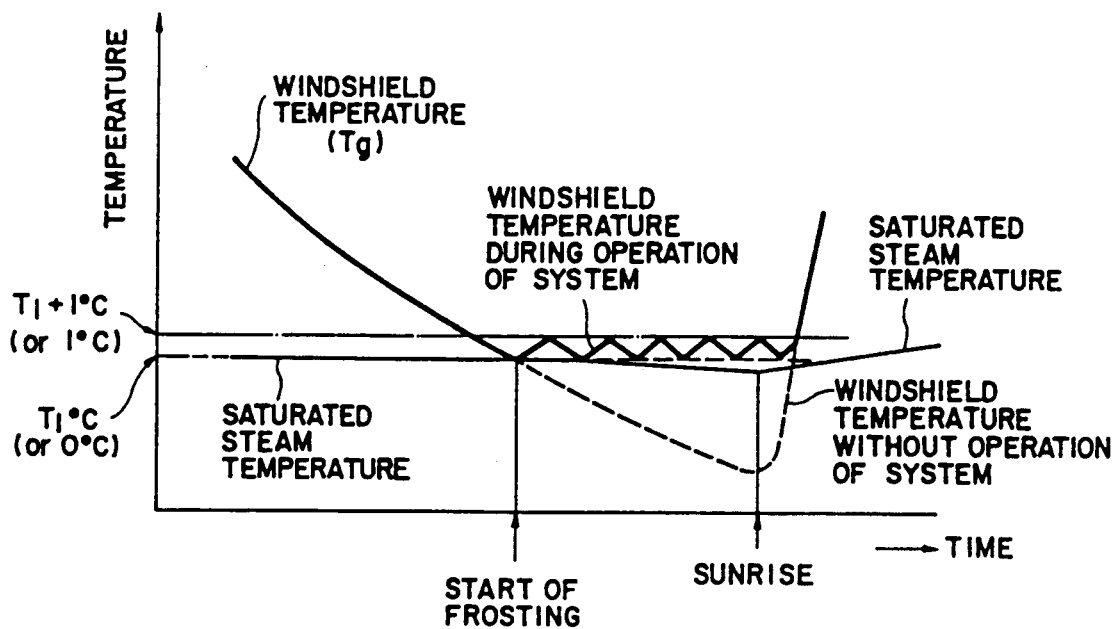
FIG. 3 is a diagram showing the operation of the anti-frost system.

FIG. 3 shows a chart indicating how the system according to the present invention operates. It will be seen that the windshield temperature Tg fluctuates within a range of 1° C. with the on-off operation of the transistor $Tr_1$ and that shortly after the sunrise the temperature Tg of the windshield 11 rises sharply. It will also be seen that the saturated steam temperature $T_1$ decreases gradually as the frosting occurs on the ground.

The present invention provides the following advantages:

(a) Since the humidity sensor is required to detect only the outside relative humidity, it is not needed to constantly detect the humidity on the surface of the windshield. The place of installation of the humidity sensor may be any place as far as the humidity sensor is in contact with the surrounding atmosphere. Thus the degree of freedom to install the humidity sensor is increased.

(b) The frosting is prevented in advance so that the defrosting time is not required.

(c) It is not necessary to change the specification of the power supply system mounted on the motor vehicle While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An anti-frost system for a windshield of a motor vehicle, having heating means incorporated in the windshield, and power supply means for supplying electric power to the heating means, said system comprising:

an atmospheric temperature sensor for sensing the atmospheric temperature and for delivering an atmospheric temperature signal indicative thereof;

a relative humidity sensor for sensing the atmospheric relative humidity and for delivering an atmospheric relative humidity signal indicative thereof;

a windshield temperature sensor for sensing the temperature of the windshield and for delivering a windshield temperature signal;

calculator means responsive to said atmospheric temperature signal and said atmospheric relative humidity signal for calculating a saturated steam temperature depending on a map representing steam density -temperature relations and for producing a saturated steam temperature signal; and operation means responsive to said saturated steam temperature signal and said windshield temperature signal for determining frosting conditions on the windshield and for supplying the electric power to the heating means in accordance with determination of said frosting conditions, so as to accurately prevent the frosting on the windshield without respect to the location of the humidity sensor.

2. The anti-frost system as claimed in claim 1, wherein said operation means operates to supply the electric power to said heating means when the windshield temperature falls to 0° C. under a condition that the saturated steam temperature is above 0° C. and when the windshield temperature falls to or below a temperature equal to the saturated steam temperature under a condition that the saturated steam temperature is equal to or below 0° C.

3. The anti-frost system as claimed in claim 2, wherein said operation means operates to cut off the supply of the electric power when the windshield temperature rises to or above 1° C. under the condition that the saturated steam temperature is above 0° C. and when the windshield temperature rises to or above a temperature higher by 1° C. than the saturated steam temperature under the condition that the saturated steam temperature is equal to or below 0° C.

4. The anti-frost system as claimed in claim 1, wherein the calculator means is adapted to feed the windshield temperature signal and to start to receive the atmospheric temperature signal and the atmospheric relative humidity signal when the temperature of the windshield has fallen to or below 1° C.

5. The anti-frost system as claimed in claim 1, further comprising:

a circuit incorporated with said windshield temperature sensor for supplying a command signal to said calculator means to begin to receive the atmospheric temperature signal and the atmospheric relative humidity signal when the temperature of the windshield has fallen to or below a predetermined degree close to 0° C.

* * * * *